Nov. 24, 1925.
W. J. BOHN
1,562,680
RETARDER FOR GRAVITY CONVEYERS
Filed Jan. 5, 1925
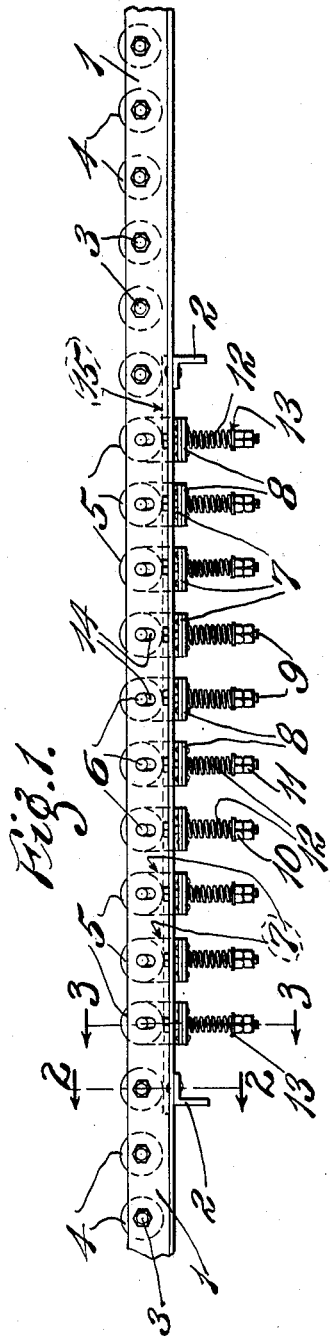
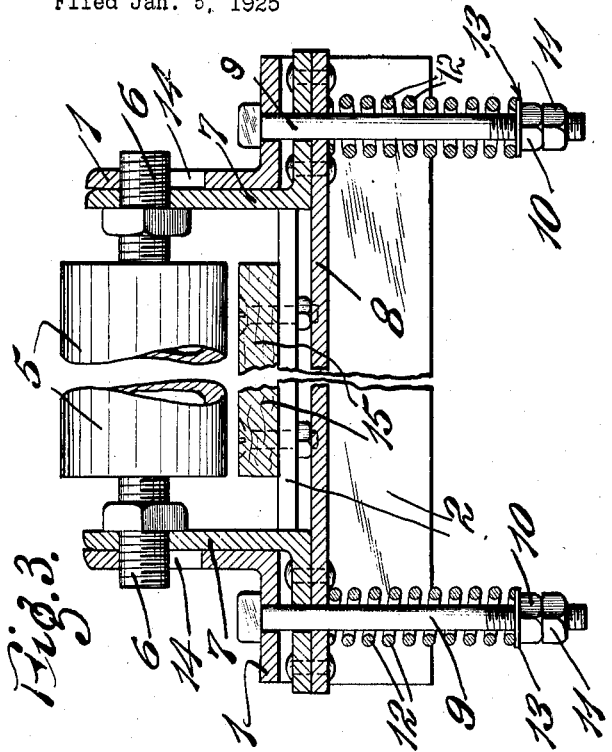
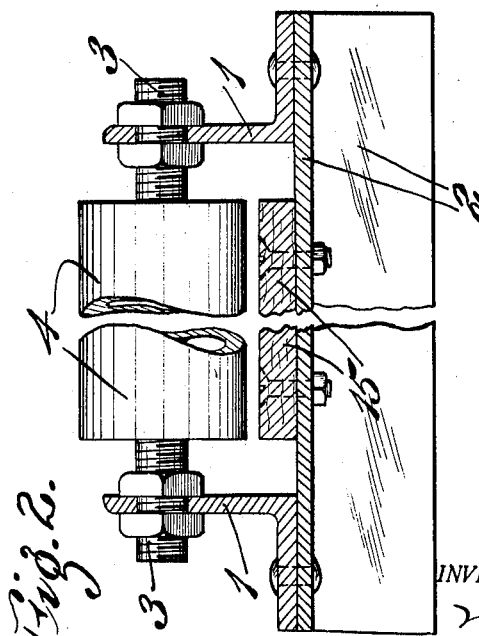
INVENTOR
W. J. Bohn,
HIS ATTORNEYS Patented Nov. 24, 1925.

1,562,680

UNITED STATES PATENT OFFICE.

WILLIAM J. BOHN, OF ST. LOUIS, MISSOURI, ASSIGNOR TO ALVEY MANUFACTURING COMPANY, OF ST. LOUIS, MISSOURI, A CORPORATION OF MISSOURI.

RETARDER FOR GRAVITY CONVEYERS.

Application filed January 5, 1925. Serial No. 554.

*To all whom it may concern:*

Be it known that I, WILLIAM J. BOHN, a citizen of the United States, and a resident of the city of St. Louis and State of Missouri, have invented a new and useful Improvement in Retarders for Gravity Conveyers, of which the following is a specification.

My invention relates to gravity conveyers. Heavy articles or packages travel more rapidly than lighter articles on the same gravity conveyer; and on a grade suitable for light articles, heavy articles are liable to develop excessive speed and collide with considerable force against the slow moving lighter articles or heavier articles that have slowed down or stopped and thereby cause considerable damage. The principal object of the present invention is to minimize the damage due to such excessive speeds and collisions; and the invention consists principally in a device for automatically retarding the speed of heavy articles. It also consists in the parts and combinations of parts hereinafter described and claimed.

In the accompanying drawing, wherein like numerals refer to like parts wherever they occur, Fig. 1 is a side elevation of a portion of a gravity conveyer embodying my invention;

Fig. 2 is a broken vertical sectional elevation on the line 2—2 of Fig. 1; and

Fig. 3 is a similar vertical section on the line 3—3 of Fig. 1.

1 designates the angle bar side plates of the ordinary type of gravity conveyer frame, which side plates are secured to an angle bar cross piece 2. Journaled on horizontal shafts preferably stub shafts 3 mounted on the respective side plates are a series of transversely disposed horizontal anti-friction rollers 4 that constitute a roller way of ordinary type.

Interposed in the roller way are a series of horizontally disposed anti-friction rollers 5 which are not directly mounted on the side bars of the way but are rotatably mounted on stub shafts 6 which in turn are mounted on angle bars 7 that are disposed parallel with the side bars of the way and have their lower flanges riveted to the tops of cross pieces 8 of flat section. The angle bars 7 together with the cross pieces 8 constitute a frame for the support of said rollers, and this frame is yieldably supported by the side bars 1 of the way. For this purpose, long headed bolts 9 project vertically downwardly through the bottom flanges of the side bars of the way and through the movable frame and the ends thereof are threaded for adjusting nuts 10 and lock nuts 11 to work upon. Surrounding the lower portion of each bolt is a helical spring 12 whose upper end bears against the underside of the movable frame and whose lower end bears against the adjusting nut or against a washer 13 interposed between said nut and said spring. By this arrangement, the movable frame is suspended from the side bars of the way by the headed bolts, but it is normally held up in its uppermost position by the helical springs acting against the bottom thereof. In order to permit movement of said frame up and down, vertically elongated slots 14 are formed in the side bars of the way to receive the stub shafts 6 that are mounted on the movable frame and project therefrom through said elongated slots. The upper ends of these slots serve as limit stops to determine the uppermost and normal position of the frame.

Mounted on a stationary part of the way is a friction member or members 15 in position for the rollers of the movable frame to bear against when said frame is lowered. The drawing illustrates such members in the form of wooden boards that are mounted on the cross pieces 2 of the way and extend longitudinally of the way underneath all of the rollers of said movable frame.

The operation of the device is as follows:

Assume that the movably supported frame is located in a roller-way or other gravity conveyer at or near the bottom of an incline. In this position, an inclination sufficient to give light articles a satisfactory speed will cause heavy articles to move at a relatively excessive speed. When the light articles reach the movable frame, the rollers thereon function as anti-friction rollers in the same manner as the other rollers of the way. When, however, a heavy article reaches the movable frame, its weight overcomes the supporting action of the helical springs and forces the movable frame down until the rollers on said movable frame bear against the friction member or members whereby enough friction is developed between said rollers and said friction members to stop or retard the movement of the rollers and such stopping or retarding of the rollers develops sufficient friction between the heavy article and the retarded rollers to slow down the speed of such heavy article. When the heavy article leaves the movable frame, said frame is lifted by the force of the helical springs to its normal position.

It is noted that for light articles, the rollers of the movable frame function as anti-friction rollers in exactly the same way as the other rollers of the way; but that for heavy articles, the rollers of the spring supported frame not only offer resistance but that such resistance increases with the weight of the article. Likewise it is noted that the springs may be adjusted so that the retarding action of the device will become operative only when the articles exceed a certain predetermined weight.

Obviously, the device hereinbefore described admits of considerable variation without departing from my invention and I do not wish to be restricted to the construction shown.

What I claim is:

1. A gravity conveyer having a yieldably supported section and means for increasing the frictional resistance to the movement of an article on said section of sufficient weight to depress said section.

2. A gravity conveyer comprising a spring supported section having an anti-friction roller forming part of the way, and a friction member in position for such roller to bear against when the load on said section exceeds a predetermined amount.

3. A roller way having a yieldably supported frame, a friction member and a roller, said roller being mounted on said frame and forming part of the way and being in position to frictionally engage said friction member when said frame yields to excessive weight thereon.

4. A gravity roller way comprising a framework and a yieldably supported section having rollers constituting part of said way, hangers suspended from said framework springs supported by said hangers and supporting said section, and a friction member supported by said framework beneath said rollers in position to frictionally engage said rollers when a heavy article depresses said section.

Signed at St. Louis, Missouri, this 31st day of December, 1924.

WILLIAM J. BOHN.